April 8, 1958 J. B. GILL 2,829,907
QUICK-COUPLING VALVE AND HOSE CONNECTION
Filed May 3, 1954 2 Sheets-Sheet 2

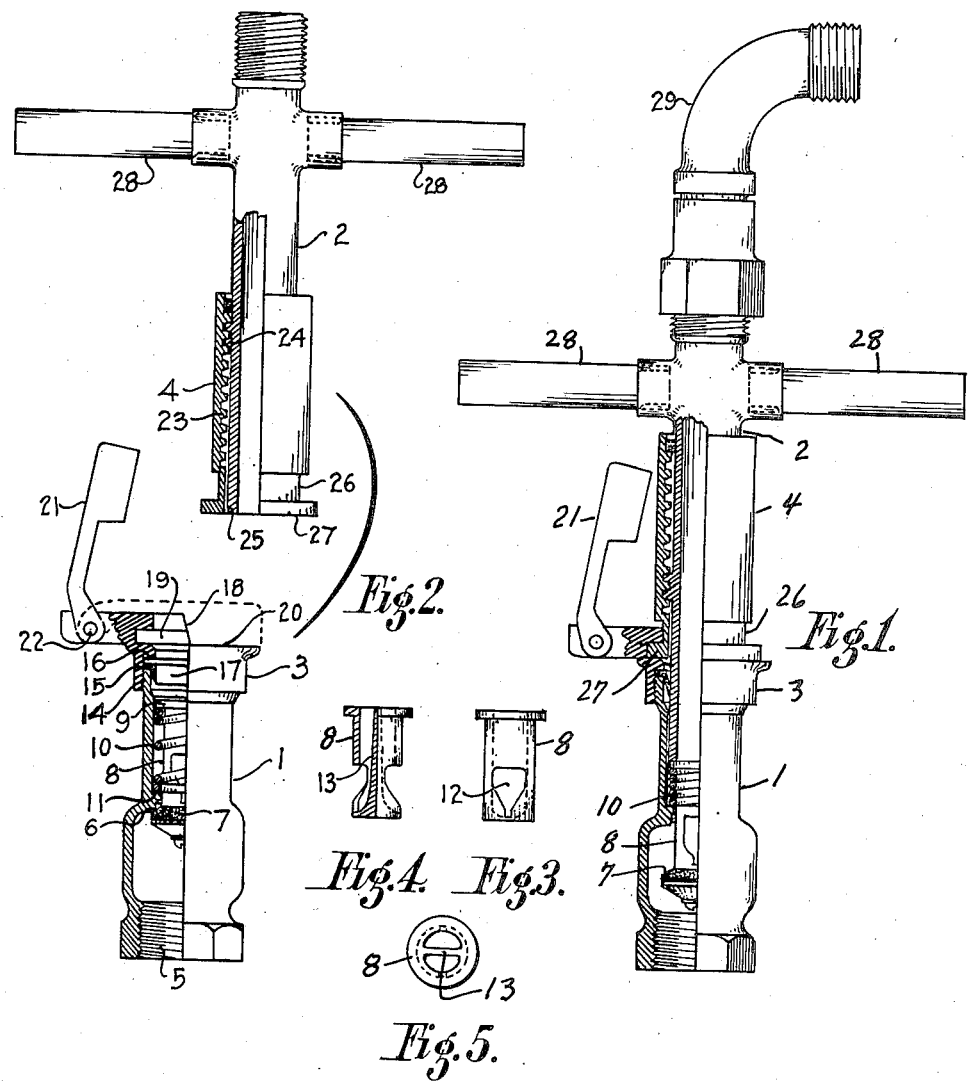

INVENTOR.
John B. Gill
BY
A. Schapp
ATTORNEY

2,829,907

QUICK-COUPLING VALVE AND HOSE CONNECTION

John B. Gill, Fresno, Calif.

Application May 3, 1954, Serial No. 427,104

4 Claims. (Cl. 284—19)

The present invention relates to improvements in a quick-coupling valve and hose connection, and its principal object is to provide means whereby a hose conduit may be quickly connected to another conduit having a valve therein, and in which the coupling at the same time may be used for operating the valve.

My invention is particularly intended for use in connection with a sprinkler system in which the water supply system terminates in vertically disposed risers, usually arranged somewhat below the ground surface, and in which the risers have normally closed valves mounted below the upper ends thereof.

My invention is particularly designed to provide a coupling by means of which the end of the sprinkler hose may be secured to the riser quickly and with little effort, and in which the coupling also carries the means for operating the valve.

It is a further object of the invention to provide for certain improvements in the valve structure, whereby the flow of water through the valve may be controlled very closely, to discharge water from a mere trickle to a full-sized stream.

It is still further proposed in my invention to provide additional improvements in the valve structure whereby the water is made to pass through the valve in smooth and parallel streams to avoid turbulence or boiling about the valve, which would tend to effect sprinkler performance and to induce loss in pressure.

It is further proposed to provide a closure coupling for the pipe which works on the same principle, but omits the valve-opening means.

Further objects and advantages of my invention will appear as the specification proceeds, and the new and useful features of the same will be fully defined in the claims attached hereto.

Figure 7:
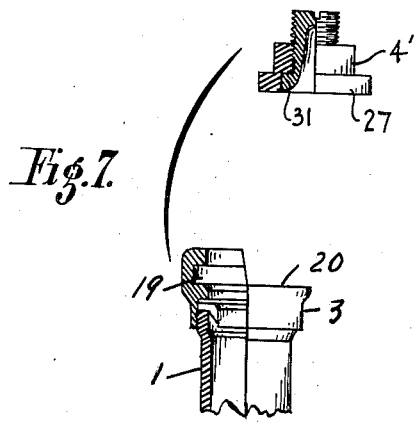
Figure 6:
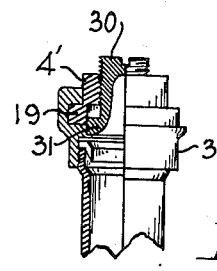

The preferred forms of my invention are illustrated in the accompanying drawings, forming part of this application, in which:

Figure 1 shows a side view of my invention, a portion being shown in section;

Figure 2, a similar exploded view, with the two parts shown separately, and ready for coupling;

Figure 3, a side view of a valve cage used in my invention;

Figure 4, a side view of the cage, taken at a right angle to that of Figure 3, with parts shown in section;

Figure 5, a top plan view of the cage;

Figure 6, a side view of a closure adapted for use in connection with a piece of hose, with a portion shown in section;

Figure 7, an exploded side view of the same closure; and

Figure 8:
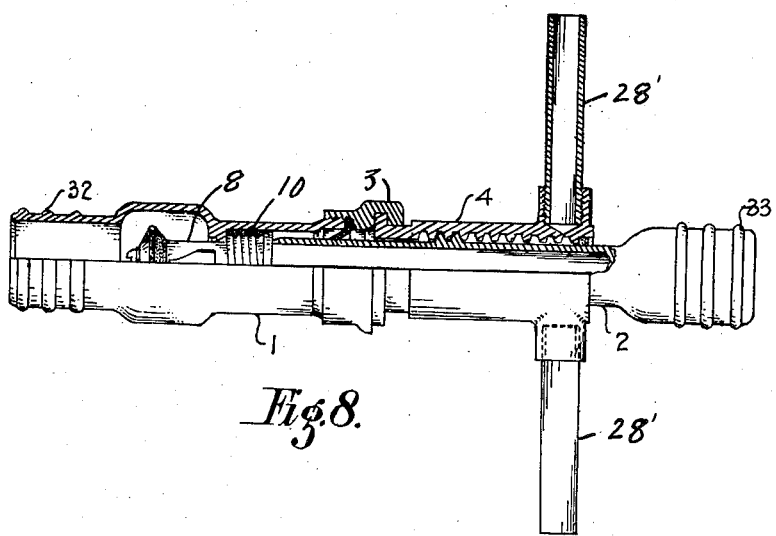

Figure 8, a side view, partly in section, of a slightly modified form of my invention intended particularly for connecting two lengths of hose, or for other uses in which it is difficult to turn either side of the conduit.

While I have shown only the preferred forms of my invention, it should be understood that various changes or modifications may be made within the scope of the claims attached hereto, without departing from the spirit of the invention.

Referring to the drawings in detail, and more particularly to the form shown in Figures 1 to 5, inclusive, my invention comprises in its principal features, a pipe section 1, which may be disposed in vertical position slightly below the ground surface of the lawn or the like, at the terminal of a water system, a second pipe section 2 adapted to be slidably received in the first pipe section, a collar 3 secured upon the upper end of the first pipe section and a sleeve 4 threaded on the second pipe section and adapted for interlocking engagement with the collar 3.

The pipe section 1 is formed at the bottom with an internal thread 5 adapted for screwing upon an underground pipe unit, and a valve seat 6 intermediate its length, the valve seat facing downward for cooperation with a valve 7 which forms part of a cage 8.

The cage 8 projects upwardly through the valve opening and has a flange 9 at its upper end. A spring 10 bears against said flange and against a fixed shoulder 11 in the pipe section and urges the cage upward for seating the valve and thereby closing the pipe section.

The cage is hollow, and when the valve is forced downward, water enters the cage through a pair of oppositely presented openings 12 in the wall of the cage for movement in an upward direction. The openings are formed, as shown particularly in Figure 3, to be relatively narrow at the lower ends and to widen gradually toward the upper ends.

Thus, when the valve is forced off its seat, the openings presented to the water at first will be very small, with the result that only a trickle of water will pass through, while on further downward movement, the openings available increase rapidly until a full stream is allowed to pass when the cage reaches its lowermost position.

The cage has a vertical vane 13 extending therethrough, midway between the openings, this vane being slightly tapered, as shown, and tending to keep the two streams of water entering through the openings separate until they have assumed definitely parallel direction of travel and merge into one another smoothly without any turbulence or boiling effect.

The collar 3 is threaded upon the upper end of the pipe section, as at 14, a washer 15 being interposed between the upper end of the pipe section and a shoulder 16 formed in the collar. The washer is made with an inner, downwardly projecting, tapered lip 17, the inner diameter of which may be slightly less than that of the pipe section below the washer.

The upper end of the collar is expanded to a larger diameter, and one-half section of the upper end is removed, so as to leave a substantially semi-circular half-section, indicated at 18, the latter section being formed with an inner groove 19. The bottom of the latter is on a plane with the upper face 20 of the remaining part of the collar on the other side.

The collar may be closed by means of a suitable conventional cover 21, hinged, as at 22.

The second pipe section 2 is dimensioned to have an easy sliding fit in the first section and to be operable for bearing on the flange 9 of the cage 8 for forcing the latter and the valve 7 downward against the tension of the spring 10.

The sleeve 4 is threaded on the pipe section 2 for longitudinal movement, the thread 23 of the sleeve extending through the major portion of the length thereof, while the thread 24 on the pipe section may be made relatively short for reducing friction. When the sleeve is in its uppermost position, as in Figure 2, its bottom is flush with the bottom of the pipe section, which latter may be slightly tapered at its lower end, as shown at 25.

The lower end of the sleeve is formed with an annular groove 26, leaving an annular shoulder 27 adapted to fit in the annular half-groove 19 in the upper end of collar 3, when introduced thereinto by a sidewise movement. When the sleeve 4 and the collar 2 are thus engaged, the two pipe sections are in axial alinement, and the upper pipe section is positioned for entering the lower pipe section 1, when the upper pipe section is screwed downward by means of the handles 28 projecting radially from the upper pipe section.

When the latter section is screwed downward, its first function is to interlock the sleeve 4 and the collar 3 so as to prevent sidewise removal of the sleeve. Next it enters the lip 17 of the washer 15 to make a seal between the two pipe sections.

Upon further downward movement of the upper pipe section, its lower end engages upon the flange 9 of the cage and forces the latter downward so as to open the valve against the tension of spring 10.

Since the cage has a close fit against the valve seat, the cage opens for the flow of water only to the extent that the openings 12 project below the valve seat. Inasmuch as the openings are very small at their lower ends, it will be seen that the flow of water may be nicely controlled, from a mere trickle to a full flow when the cage has been forced down to its limit.

In the form shown in Figures 1 to 5, inclusive, it is assumed that the pipe section 2 is freely revolvable, its upper end having a conventional swivel connection with an elbow 29, to which the hose is connected.

My coupling means may also be readily used as a mere closure, with the valve-operating means omitted. This form is illustrated in Figures 6 and 7, in which the collar 3 is constructed as previously described and secured upon the end of pipe section 1 to be sealed.

A sleeve 4', corresponding substantially to the sleeve 4 of the first form of the invention, has the same shoulder 27 adapted for introduction in the semi-circular groove 19 of the collar by a sidewise movement, and a screw 30, corresponding to the pipe section 2, is threaded into the sleeve and has a flange 31 adapted to enter the collar below the groove 19 for anchoring the sleeve against sidewise removal.

The form of my invention shown in Figure 8 is similar to that shown in Figure 1, except that it is intended for a coupling for two lengths of hose, in which each length is permanently fastened to its pipe section 1 or 2, as by clamps engaging over ribbed ends 32—33 thereof, and in which it would be inconvenient to rotate either hose for advancing the pipe sections into the pipe section 1.

To avoid this difficulty, the two handles 28' are secured upon the sleeve 4 rather than upon the pipe section, so that the sleeve is rotated for effecting the engagement, rather than the pipe section. In all other respects the construction of this form is the same as in Figure 1, and similar numerals have been applied to corresponding parts.

It is apparent, that in the form of Figure 8, the connections may be readily reversed, where it is desired to have the valve located in the removable portion of the system, as for instance in a dispensing connection for a ship oil line. In this case, the pipe section 2 might be connected to the oil supply, and the pipe 1 to the dispensing hose, with the result that the valve would form part of the removable hose and would automatically close, upon disconnection from the stationary line, to confine the oil in the hose, for later discharge, at a more opportune time and location.

In operation, the pipe section 2, as shown in Figure 2, is lowered upon section 1 in off-set relation until the shoulder 27 strikes the flat face 20 of the collar 3, whereupon the shoulder is engaged in the groove 19 by a sidewise movement.

A slight turning movement of the pipe 2 by means of the handles 28 will lock the shoulder in the collar.

For opening the valve, the turning movement is continued until the valve is unseated, whereupon water enters from below through section 2. The amount of flow can be exactly controlled by arresting the turning movement at the proper time, and the vane in the cage keeps the two streams entering separated until they have adopted parallel courses and merge without boiling or turbulence.

The same coupling applied to a closure forms an effective lock which can only be opened by use of a suitable tool; and the coupling with its valve control may be used in many different situations, as shown and described.

It involves a safety feature insofar as the valve cannot be opened until the coupling is in correct position, and the coupling cannot be disconnected as long as the pipe section 2 is inserted in pipe section 1.

I claim:

1. In a valve coupling for a sprinkler system, a pipe having a lower end threaded for connection to an underground water system and having a valve seat spaced from the upper end thereof and a valve cooperative with the seat for closing the pipe, spring means urging the valve into pipe closing position, the pipe having an enlarged, substantially semi-circular upper end with an internal groove in said end, a sleeve member having a collar adapted for sidewise introduction in the groove, a hollow plunger member inside the sleeve and having an upper end adapted for a hose connection and being of substantially uniform diameter and dimensioned for a sliding fit in the pipe, and a threaded connection between the two members operable for moving the plunger into the pipe when one of the members is rotated for locking the sleeve against sidewise removal, the threaded connection being operable, upon further rotation, to cause the plunger to bear on the valve for opening the same, and the valve being spaced from the upper end of the pipe sufficiently to allow the locking operation to be carried out independently of the valve operation.

2. A valve coupling as defined in claim 1, in which the pipe has a washer interposed between its enlarged end and the valve to provide a seal about the plunger before the latter is made to open the valve.

3. A valve coupling as defined in claim 1, in which the valve is in the form of a cage having a close sliding fit with the valve seat and having openings on opposite sides thereof, with the openings made to expand from the leading end to the trailing end.

4. A valve coupling as defined in claim 1, in which the valve is in the form of a cage having a close sliding fit with the valve seat and having openings on opposite sides thereof, with the openings made to expand from the leading end to the trailing end, and with a vane disposed between the openings to direct liquid entering from opposite sides into parallel paths.

References Cited in the file of this patent

UNITED STATES PATENTS

| | | |
|---|---|---|
| 448,693 | Tinsley | Mar. 24, 1891 |
| 1,603,752 | Ellis | Oct. 19, 1926 |
| 1,944,191 | Newmark et al. | Jan. 23, 1934 |
| 1,954,827 | Newmark et al. | Apr. 17, 1934 |
| 2,050,647 | Carter | Aug. 11, 1936 |
| 2,121,244 | Buckner | June 21, 1938 |
| 2,355,408 | Wyss | Aug. 8, 1944 |
| 2,638,914 | Flaith | May 19, 1953 |

FOREIGN PATENTS

| | | |
|---|---|---|
| 582,136 | Germany | Aug. 9, 1953 |